United States Patent
Lee et al.

(10) Patent No.: US 9,319,943 B2
(45) Date of Patent: Apr. 19, 2016

(54) METHOD AND APPARATUS FOR SUPPORTING MULTIMEDIA SERVICE IN ELECTRONIC DEVICE

(71) Applicant: Samsung Electronics Co., Ltd., Gyeonggi-do (KR)

(72) Inventors: Sang-Soo Lee, Gyeonggi-do (KR); Hye-Jeong Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 96 days.

(21) Appl. No.: 14/215,142

(22) Filed: Mar. 17, 2014

(65) Prior Publication Data

US 2014/0286308 A1   Sep. 25, 2014

(30) Foreign Application Priority Data

Mar. 21, 2013   (KR) .......................... 10-2013-0030454

(51) Int. Cl.
*H04W 36/00*   (2009.01)

(52) U.S. Cl.
CPC ............ *H04W 36/0022* (2013.01); *Y02B 60/50* (2013.01)

(58) Field of Classification Search
None
See application file for complete search history.

(56) References Cited

U.S. PATENT DOCUMENTS

| 2013/0250830 | A1* | 9/2013 | Ganesan ....................... 370/311 |
| 2013/0308620 | A1* | 11/2013 | Bharadwaj .................... 370/338 |
| 2013/0316762 | A1* | 11/2013 | Charbit et al. ............. 455/552.1 |
| 2014/0011492 | A1* | 1/2014 | Bharadwaj ................. 455/422.1 |
| 2014/0157009 | A1* | 6/2014 | Kherani ....................... 713/300 |
| 2014/0286308 | A1* | 9/2014 | Lee et al. .................... 370/331 |

FOREIGN PATENT DOCUMENTS

KR   10-2012-0002621 A   1/2012

\* cited by examiner

*Primary Examiner* — Benjamin H Elliott, IV
(74) *Attorney, Agent, or Firm* — Cha & Reiter, LLC (57) ABSTRACT

A method in an electronic device, comprises, in response to an Internet Protocol (IP) voice packetized data call being performed in a first call session of a first communication processor and occurrence of a handover event from the first communication processor to a second communication processor, receiving at least one of, (a) a control message and (b) IP packetized voice data, via the second communication processor. The control message received from the second communication processor is forwarded to the first communication processor.

20 Claims, 5 Drawing Sheets

METHOD AND APPARATUS FOR SUPPORTING MULTIMEDIA SERVICE IN ELECTRONIC DEVICE

CLAIM OF PRIORITY

The present application claims the benefit under 35 U.S.C. §119(a) to a Korean patent application filed in the Korean Intellectual Property Office on Mar. 21, 2013, and assigned Serial No. 10-2013-0030454, the entire disclosure of which is hereby incorporated by reference.

BACKGROUND

1. Technical Field

The present system concerns data processing supporting a multimedia service in an electronic device.

2. Description of Related Art

A Long Term Evolution (LTE) system provides a data service, and a Voice over LTE (VoLTE) system provides a voice call service based on the data service of the LTE system. The VoLTE is required to interwork with various Internet Protocol (IP) Multimedia Subsystem (IMS) services such as Voice over WiFi (VoWiFi), which support a voice call service using WiFi as well as a voice call using the LTE. A VoLTE can be processed by a cellular modem or a communication modem and the VoWiFi can be processed by an Application Processor (AP) via a WiFi modem.

An IP security protocol (IPSec) is used to provide safe encrypted communication between two nodes in an unsecured network. The IPSec, which is a known standardized method for providing security in an IP network layer, supports two security services including Authentication Header (AH) for authenticating a data sender and Encapsulating Security Payload (ESP) supporting both sender authentication and data encryption, and provides a tunnel mode for providing a security tunnel between security gateways and a transport mode for providing a security tunnel between end hosts. It is necessary to provide seamless voice communication service by supporting IPSec but also handover from the VoLTE to the VoWiFi or handoff from the VoWiFi to the VoLTE. In addition, when the IMS service is supported, it is necessary to satisfy service quality such as requirements of voice delay and current consumption by considering the IPSec or the handover from the VoLTE to the VoWiFi.

SUMMARY

A system addresses the above-discussed deficiencies and minimizes voice delay and current consumption and operates with an IMS service such as VoWiFi regardless of whether TCP/UDP and IPSec are applied. The system processes a status check message in a modem when IPSec is activated and a voice call is handed off from VoLTE to VoWiFi.

A method in an electronic device, comprises, in response to an Internet Protocol (IP) voice packetized data call being performed in a first call session of a first communication processor and occurrence of a handover event from the first communication processor to a second communication processor, receiving at least one of, (a) a control message and (b) IP packetized voice data, via the second communication processor. The control message received from the second communication processor is forwarded to the first communication processor.

In a feature, the control message comprises one of a Session Initiation Protocol (SIP) message and a status check message for the first call session. Also the method includes processing the IP packetized voice data received from the second communication processor using a predetermined procedure and forwarding the IP packetized voice data received from the second communication processor to the first communication processor. The first communication processor processes the IP packetized voice data using a predetermined procedure. The first call session of the first communication processor employs an IP Security (IPSec) tunneling mode for providing a security tunnel between security gateways in processing packetized voice data. In response to the control message received from the second communication processor being a status check message, the status check message is processed according to a predetermined procedure using the first communication processor. In response to the control message received from the second communication processor not being a status check message, the first communication processor forwards the control message to the second communication processor. In addition, the method generates a second call session for a video call service by activating the first communication processor and processes video data or audio data received in the second call session.

In another feature an electronic device includes a first communication processor and a second communication processor. In response to an Internet Protocol (IP) voice packetized data call being performed in a first call session of a first communication processor and occurrence of a handover event from the first communication processor to a second communication processor, an application processor receives at least one of, (a) a control message and (b) IP packetized voice data, via the second communication processor and forwards the control message received from the second communication processor to the first communication processor.

In a further feature, the control message comprises one of a Session Initiation Protocol (SIP) message and a status check message for the first call session and the application processor processes the packetized voice data received from the second communication processor according to a predetermined procedure. The application processor forwards the packetized voice data received from the second communication processor to the first communication processor, and the first communication processor processes the packetized voice data using a predetermined procedure. The first call session of the first communication processor employs an IP Security (IPSec) tunneling mode. In response to the control message received from the second communication processor being a status check message, the first communication processor processes the status check message using a predetermined procedure. Also in response to the control message received from the second communication processor not being a status check message, the first communication processor forwards the control message to the second communication processor. The application processor generates a second call session for a video call service by activating the first communication processor, and processes video data or audio data received in the second call session.

In yet a further feature an apparatus supports a multimedia service of an electronic device that uses a cellular communication processor in a voice packet service based on Voice over Long Term Evolution (LTE) (VoLTE) and configured to forward a first Session Initiation Protocol (SIP) message to an application processor and to process a second SIP message. The cellular communication processor supports Internet Protocol (IP) Security (IPSec) protocol. The application processor is configured to process the first SIP message and video data from the cellular communication processor. In response to a voice packet service based on the VoLTE transitioning to a voice packet service based on Voice over WiFi (VoWiFi). An enhanced Packet Data Gateway (ePDG) client classifies a SIP message and voice data from a WiFi communication processor and forwards the classified SIP message to the cellular communication processor, and forwards the voice data to the application processor.

In an additional feature, the cellular communication processor supports at least one of Real Time Protocol (RTP) and RTP Control Protocol (RTCP) and the second SIP message is a keep-alive message and a destination for a Transmission Control Protocol (TCP)/IP SIP message is the cellular communication processor.

BRIEF DESCRIPTION OF THE DRAWINGS

The above and other aspects, features, and advantages of certain exemplary embodiments of the system will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of exemplary system embodiments. It includes various specific details to assist in that understanding but these are to be regarded as merely exemplary. Accordingly, those of ordinary skill in the art will recognize that various changes and modifications of the embodiments described herein can be made. In addition, descriptions of well-known functions and constructions may be omitted for clarity and conciseness.

It is to be understood that the singular forms "a," "an," and "the" include plural forms unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments advantageously minimize voice delay and current consumption by processing voice call data in a modem and supporting handover from Voice over Long Term Evolution (LTE) (VoLTE) to Voice over WiFi (VoWiFi) when an Internet Protocol (IP) security protocol (IPSec) is applied in an electronic device supporting the VoLTE and the VoWiFi.

When the IPSec is activated and handover from the VoLTE to the VoWiFi takes place, a system processes a status check message (e.g., keep-alive message) periodically exchanged with a network in the modem. The status check message indicates a message sent by one network to another network to notify that a virtual connection line between them is still active. That is, the status check message is a control message sent at regular time intervals to determine whether the communication is normal. When the status check message or a response message to the status check message is not received within a certain time period, the communication line can be disconnected or backup can be commenced by determining an abnormal communication path or an abnormal condition of the other device.

Figure 1:
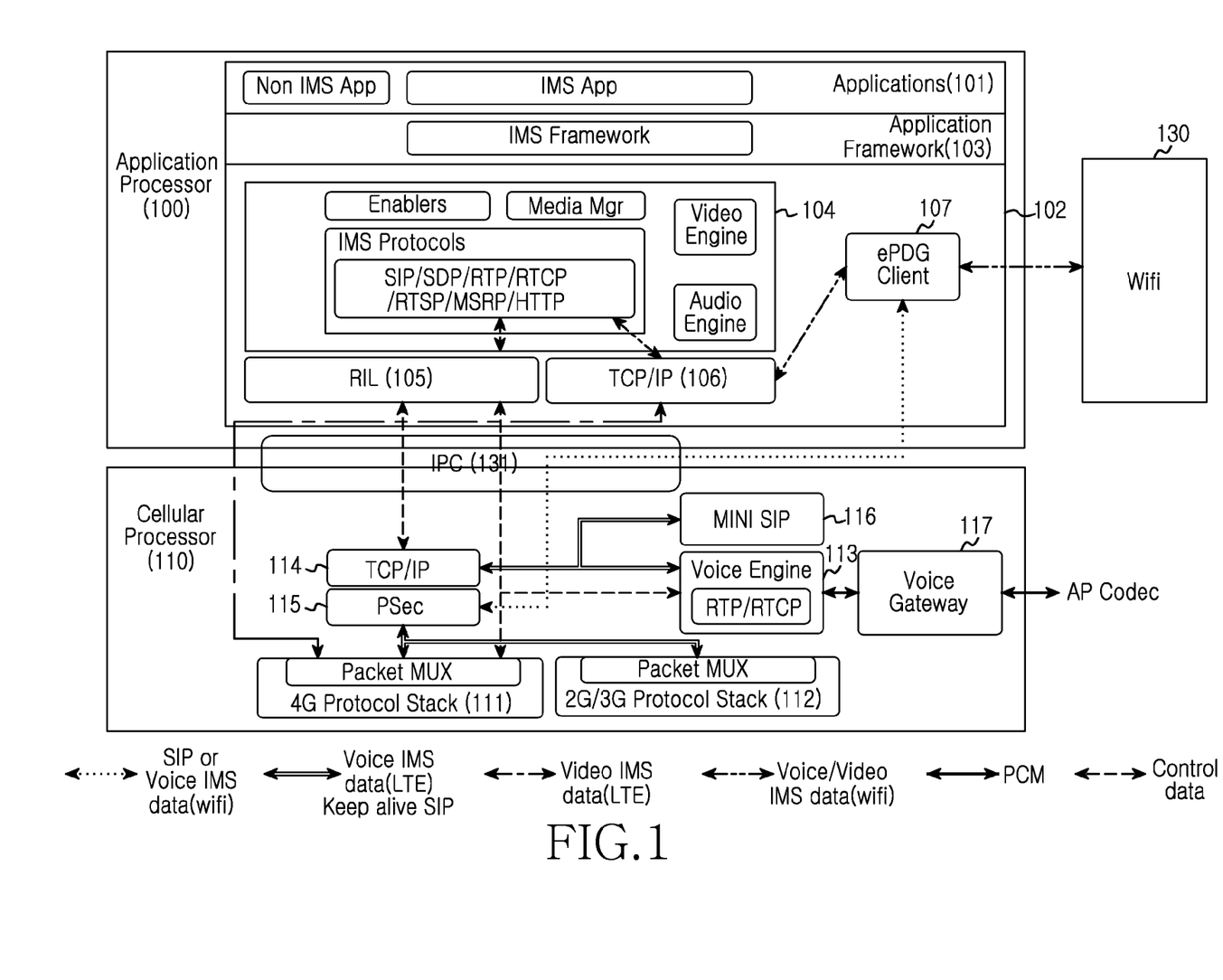
FIG. 1 shows an Application Processor (AP) and a Modem Processor (MP) according to invention principles.

FIG. 1 shows an Application Processor (AP) 100 and a cellular Processor 110. The AP 100 provides a multimedia service using at least one software program. For example, the AP 100 includes an application layer 101, a library layer 102, and a framework layer 103. The AP 100 can further include other components. The application layer 101 indicates a region where the application is driven. For example, the application layer 101 can drive an IP Multimedia Subsystem (IMS) application, a non IMS application, and a phone application executable in the electronic device. The framework layer 103 interconnects the application layer 101 and the library layer 102. The library layer 102 includes modules for providing IMS services, such as IMS library 104 including IMS protocol stack, a video engine, and an audio engine, a Radio Interface Layer (RIL) 105, a Transmission Control Protocol (TCP)/IP 106, and an enhanced Packet Data Gateway (ePDG) client 107. The library layer 102 can further include other components.

The IMS library 104 can include devices and software for driving the IMS protocol stack and an IMS application. For example, the IMS protocol stack can include a protocol defined in the IMS standard, such as Session Initiation Protocol (SIP), Session Description Protocol (SDP), Real Time Protocol (RTP), RTP Control Protocol (RTCP), Real Time Streaming Protocol (RTSP), Message Session Relay Protocol (MSRP), and Hypertext Transfer Protocol (HTTP). The video engine and the audio engine of the IMS library 104 include devices and software for processing video data and audio data. For example, the video engine includes the device and the software for processing the video data, and the audio engine includes the device and the software for processing the audio data. The RIL 105 provides an interface between an operating system for the wireless terminal, for example, the AP 100 and the radio protocol stack of the cellular processor 110. The RIL 105 interconnects a communication processing module such as Short Message Service (SMS), voice communication, and data communication, and an AT command or unique communication protocol. TCP/IP 106, is an Internet standard protocol, using a protocol stack defined for the data communication of the node.

The ePDG client 107 receives a SIP message or voice packet data via the WiFi modem 130. The SIP message or the voice packet data is received via the WiFi modem 130 when part of voice traffic received over a 2G/3G/4G network is distributed to the WiFi network or handed over from the VoLTE to the VoWiFi as the data traffic received over the 2G/3G/4G network increases. The cellular processor 110 applies initial IP security and thus a session is generated, the ePDG client 107 forwards the SIP message received via the WiFi modem 130 to the IPSec layer 115 of the cellular processor 110 and forwards the voice packet data received via the WiFi modem 130 to the TCP/IP module 106 of the AP 100. That is, when the traffic is handed over from the VoLTE to the VoWiFi or distributed, the SIP message received via the WiFi modem 130 may be processed in the cellular processor 110 and the voice packet data may be processed in the AP 100 so as to maintain the session generated by initially applying the IP security in the cellular processor 110. Alternatively, when the traffic is handed over from the VoLTE to the VoWiFi or distributed, both of the SIP message and the voice packet data received via the WiFi modem 130 can be forwarded to the IPSec layer 115 of the cellular processor 110.

The cellular processor 110 processes bidirectional communication data conveyed through communication with an external base station using corresponding protocol stacks 111 and 112. For example, the cellular processor 110 includes a plurality of submodules such as interface with a Radio Frequency (RF) system, physical layer, and protocol stack. A modem transceiver may be divided into a plurality of communication submodules for supporting different communication networks. For example, the communication networks may include, a Global System for Mobile Communication (GSM) network, an Enhanced Data GSM Environment (EDGE) network, a Code Division Multiple Access (CDMA) network, a W-CDMA network, a Long Evolution Network (LTE) network, and an Orthogonal Frequency Division Multiple Access (OFDMA) network. In addition, the cellular processor 110 includes a TCP/IP 114 unit supporting the Internet standard protocol, an IPSec 115 unit for processing IP security, a MINI SIP 116, a voice gateway 117 for forwarding a Pulse Code Modulation (PCM) signal to a CODEC (not shown) of the cellular processor 110, and a voice engine 113 for processing the voice signal. Cellular processor 110 can further include other components.

The IPSec 115 unit provides standard security in the IP network layer and supports two security services including Authentication Header (AH) for authenticating a data sender and Encapsulating Security Payload (ESP) for supporting both sender authentication and data encryption, and provides a tunnel mode for providing a security tunnel between security gateways and a transport mode for providing a security tunnel between end hosts. The IPSec 115 can process the SIP message or the voice packet data received via the WiFi modem 130 according to the corresponding security procedure, and forward the SIP messages or the voice packet to the TCP/IP layer 114. The TCP/IP layer 114 can forward the SIP message corresponding to the status check message of the processed SIP message to the MINI SIP 116, forward the other SIP messages to the AP 100 via the RIL 105, and forward the processed voice packet data to the voice engine 113. Alternatively, the SIP messages are not sent to the AP 100 via the RIL 105 but instead the SIP messages may be forwarded to the MINI SIP 116.

The MINI SIP 116 receives and processes all or part of the SIP messages from the WiFi modem 130 in the ePDG client 107. The voice engine 113 minimizes the voice delay by processing the voice data according to the RTP or the RTCP. Alternatively, the voice engine 113 can further include all or part of the IMS protocol stack (e.g., SDP, RTSP, MSRP, HTTP) for supporting the IMS service. As such, when the traffic is handed over from the VoLTE to the VoWiFi or distributed, the cellular processor processes all or part of the SIP messages to maintain a secured session. Inter Processor Communication (IPC) 131 is an interface path between the AP 100 and the cellular processor 110 supporting communication therebetween. The WiFi modem 130 receives the SIP messages or the voice packet data according to a corresponding communication protocol (e.g., Institute of Electrical and Electronics Engineers (IEEE) 820.11 standard), and forwards the SIP messages or the voice packet data to the ePDG client 107.

The cellular processor 110 is an end point for TCP/IP voice data and SIP messages. The voice call and the VoLTE can be processed by the cellular processor 110, and video data and audio data for the video call and the VoWiFi can be processed by the AP 110. For a video call, the AP 100 drives the IMS library 104 and thus processes the video data and the audio data fed from the WiFi modem 130 or the cellular processor 110. The TCP/IP 106 and ePDG client 107 process video data and audio data provided via the WiFi modem 130. Cellular processor 110 processes a voice call through SIP signaling and provides a voice call service over a PS network by processing the audio data. In so doing, the AP 100 and the WiFi modem 130 are deactivated to advantageously reduce the power consumption of the electronic device. A voice call service over the PS network includes a Voice of IP (VoIP) service.

For example, in the voice call service, the cellular processor 110 establishes a session through the WiFi modem 130 and provides a voice call service over the PS network by processing the audio data for the voice call service. In so doing, the cellular processor 110 can be advantageously deactivated to reduce the power consumption of the electronic device.

Initially, cellular processor 110 establishes a session through the SIP signaling and provides a voice call service over a PS network by processing audio data of the voice call service. When the traffic is handed over from the VoLTE to the VoWiFi or distributed, the cellular processor 110 processes the SIP message from the WiFi modem 130 and the AP 100 processes the voice packet data to maintain seamless voice call service in the current session.

Likewise, initially, while the cellular processor 110 establishes the session through the SIP signaling and then provides the voice call service over the PS network the AP 100 processes the SIP message from the WiFi modem 130 and the cellular processor 110 processes the voice packet data to maintain the seamless voice call service in the current session. Location of the ePDG client 107 is not limited to being inside the AP 100 and may be separated from the cellular processor 110 and the AP 100.

Figure 2:
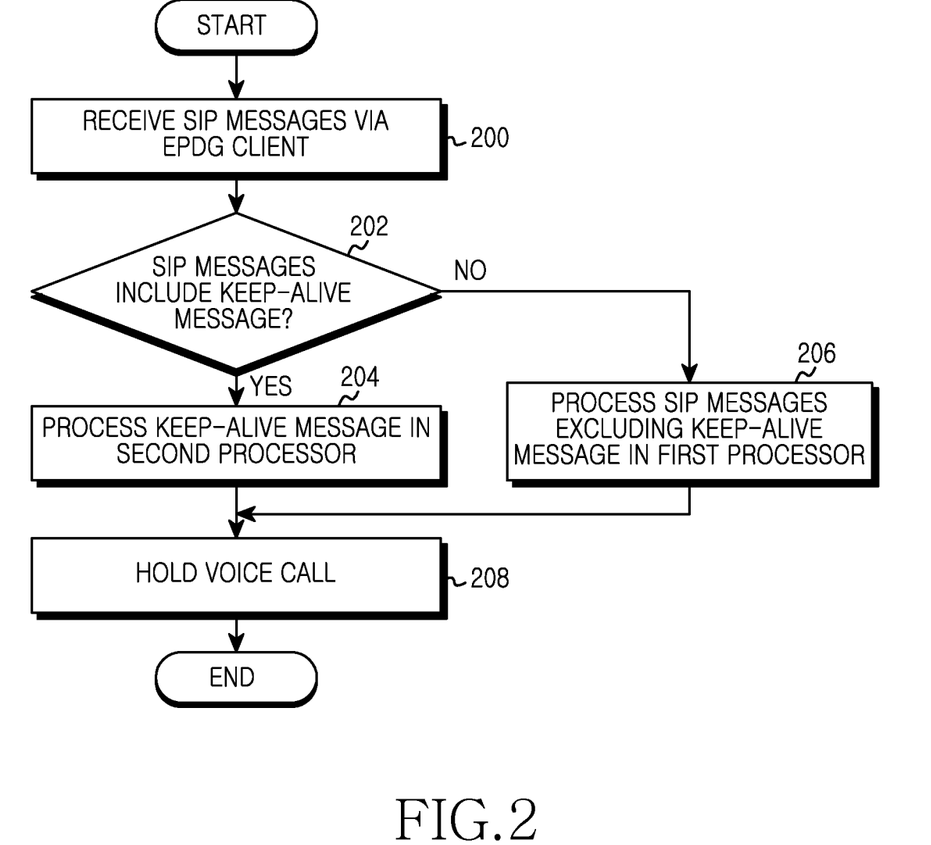
FIG. 2 shows a flowchart of a method for processing a status check message in the MP during a voice call service according to invention principles.

FIG. 2 shows a flowchart of a method for processing a status check message. Cellular processor 110 receives SIP messages in step 200 and determines whether the received SIP messages include a SIP message comprising a status check message in step 202. In step 204, the cellular processor 110 processes a status check SIP message received in step 202. When the SIP message is not a status check message, the cellular processor 110 forwards the received SIP message to the AP 100 for processing in step 206. Cellular processor 110 processes the status check message to maintain AN initial voice call session. Cellular processor 110 processes the status check SIP message and forwards the other SIP messages to the AP 100. Hence, wakeup of the AP 100 for the status check message is eliminated reducing current consumption. A voice call is supported in step 208.

Figure 3:
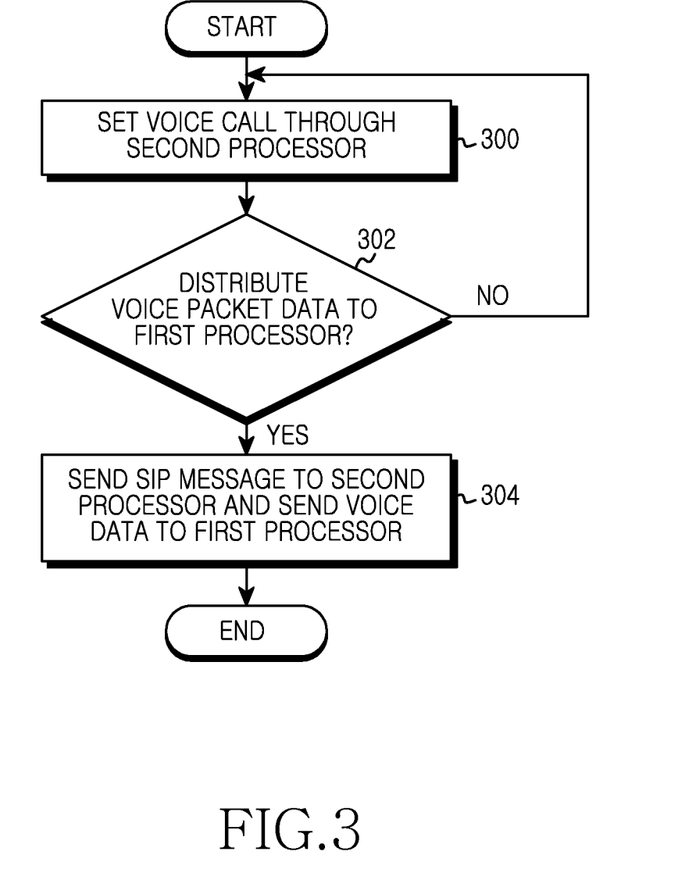
FIG. 3 shows a flowchart of a method for processing SIP messages including a status check message in an AP during a voice call service according to invention principles.

FIG. 3 shows a flowchart of a method for processing the SIP messages including the status check message in the AP during a voice call service. AP 100 directs the voice call through the cellular processor 110 in step 300 and determines whether the traffic distribution or handover event occurs from the cellular 100 to the AP 100 in step 302. The traffic distribution or handover event may be generated by the electronic device or a higher network entity. In step 304, when such an event arises, a SIP message is sent to the cellular processor and the voice packet data is sent to the AP. Alternatively, the SIP message and the voice packet data may be sent to the AP. That is, in the handover from the VoLTE to the VoWiFi, the SIP message is forwarded from the ePDG client to the cellular processor and processed in the cellular processor, and the voice packet data is forwarded from the ePDG client to the AP and processed in the AP.

Figure 4:
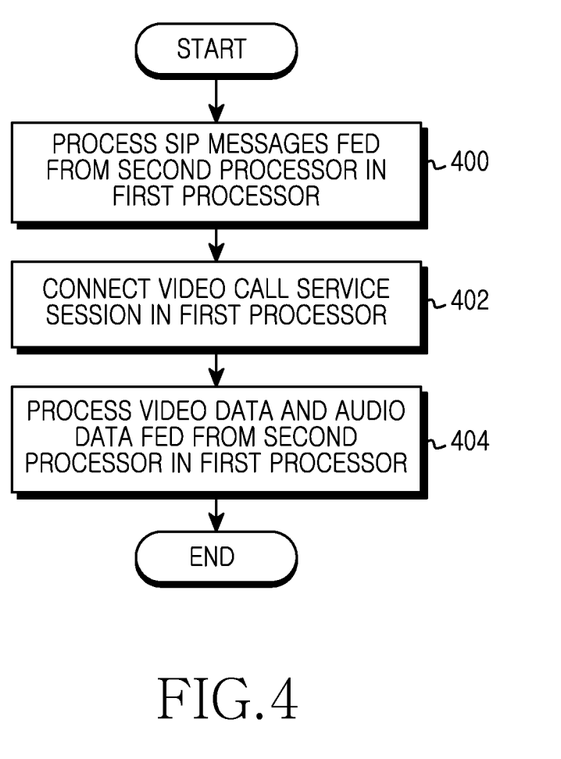
FIG. 4 shows a flowchart of a method for processing video data and audio data in a video call service according to invention principles.

FIG. 4 shows a flowchart of a method for processing the video data and the audio data in a video call. In the video call service, the AP processes the SIP message by activating the cellular processor in step 400 and connects the session for the video call service using the SIP signaling in step 402. In step 404, the AP processes the video data and the audio data fed from the cellular processor.

Figure 5:
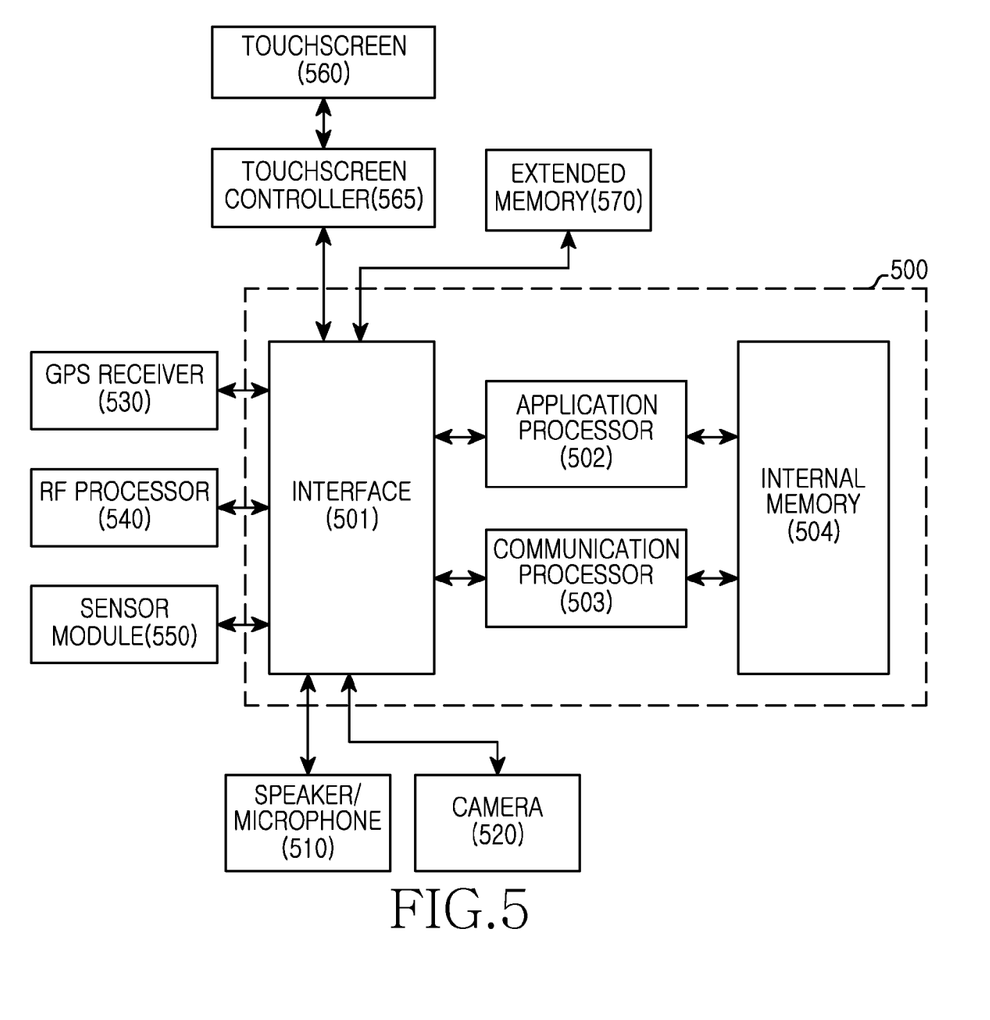
FIG. 5 shows an electronic device according to invention principles.

FIG. 5 shows an electronic device that may employ portable electronic devices such as portable terminal, mobile terminal, mobile pad, media player, tablet computer, handheld computer, or Personal Digital Assistant (PDA). The electronic device may be a portable electronic device combining two or more functions of those devices. The electronic device includes a controller 500, a speaker/microphone 510, a camera 520, a Global Positioning System (GPS) receiver 530, an RF processor 540, a sensor module 550, a touch screen 560, a touch screen controller 565, and an extended memory 570. The controller 500 can include an interface 501, one or more processors 502 and 503, and an internal memory 504. Controller 500 may be referred to as a processor. The interface 501, the AP 502, the communication processor 503, and the internal memory 504 can be separate components or integrated onto one or more integrated circuits.

The AP 502 performs different functions (e.g., IMS service support) for the electronic device by executing different software programs, and the communication processor 503 processes and controls the voice communication and the data communication. In addition to these typical functions, the processors 502 and 503 also execute a particular software module (instruction set) stored in the extended memory 570 or the internal memory 504 and conduct particular functions corresponding to the module. That is, the processors 502 and 503 carry out the present method for supporting the multimedia service in association with software modules stored in the extended memory 570 or the internal memory 504.

For example, the communication processor 503 receives the SIP messages from the AP 502, determines whether the received SIP messages include a SIP message comprising a status check message, processes the SIP messages when the received SIP message is the status check message, and forwards the received SIP messages to the AP 502 for processing when the received SIP message is not the status check message. Communication processor 503 processes the status check message of the SIP messages and forwards the other SIP messages to the AP 502. This advantageously avoids wakeup of the AP 502 for the status check message reducing current and power consumption. The AP 502 directs the voice call through the communication processor 503, and determines whether a traffic distribution or handover event occurs from the communication processor 503 to the AP 502. When such an event arises, the AP 502 forwards the SIP messages to the communication processor 503 and processes the voice packet data. Alternatively, the SIP message and the voice packet data may be sent to the AP 502. That is, in case of the handover from the VoLTE to the VoWiFi, the SIP message is forwarded to, and processed by, the communication processor 503, and the voice packet data is forwarded to, and processed by, the AP 502.

During a video call service, the AP 502 processes the SIP messages by activating the communication processor 503, connects the session for the video call service using the SIP signaling, and processes the video data and the audio data fed from the communication processor 503. Another processor (not shown) can include one or more data processors, an image processor, or a CODEC. The data processors, the image processor, or the CODEC may be individual processor or include a plurality of processors for different functions. The interface 501 interconnects the touch screen controller 565 and the extended memory 570 of the electronic device. The sensor module 550 is coupled to the interface 501 to allow different functions. For example, a motion sensor and an optical sensor can be coupled to the interface 501 to detect a motion of the electronic device or to detect light from the outside. Different sensors such as position determining system, temperature sensor, or biometric sensor can be connected to the interface 501 to conduct related functions. The camera 520 is coupled to the sensor module 550 through the interface 501 to perform a camera function such as photo and video clip recording.

The RF processor 540 performs a communication function. For example, under control of the communication processor 503, the RF processor 540 converts an RF signal to a baseband signal and provides the baseband signal to the communication processor 503, or converts a baseband signal output from the communication processor 503 to an RF signal and transmits the RF signal. Communication processor 503 processes the baseband signal according to different communication schemes. For example, the communication scheme can include, but is not limited to, the GSM communication scheme, the EDGE communication scheme, the CDMA communication scheme, the W-CDMA communication scheme, the LTE communication scheme, the OFDMA communication scheme, the Wi-Fi communication scheme, the WiMax communication scheme, and/or the Bluetooth communication scheme.

The speaker/microphone 510 can input and output an audio signal for voice recognition, voice reproduction, digital recording, and telephone function. That is, the speaker/microphone 510 converts the voice signal to an electric signal or converts the electric signal to the voice signal. An attachable and detachable earphone, headphone, or headset can be connected to the electronic device through an external port. The touch screen controller 565 can be coupled to the touch screen 560. The touch screen 560 and the touch screen controller 565 can detect performance and termination of a touch and device motion using, capacitive, resistive, infrared and surface sound wave methods, for example, for determining one or more touch points on touch screen 560. The system may use a multitouch detection method including different proximity sensor arrays or other elements.

The touch screen 560 provides an input/output interface between the electronic device and a user and forwards data indicating a detected touch input to the electronic device. The touch screen 560 also presents a visual output to the user in text, graphic, video form, or a combination thereof The touch screen 560 can employ different displays, such as, Liquid Crystal Display (LCD), Light Emitting Diode (LED), Light emitting Polymer Display (LPD), Organic LED (OLED), Active Matrix OLED (AMOLED) or Flexible LED (FLED), for example. The GPS receiver 530 converts a signal received from a satellite, to information such as location, speed, or time. For example, a distance between the satellite and the GPS receiver 530 can be calculated by multiplying the speed of light by a signal arrival time, and the location of the electronic device can be measured using the well-known triangulation by obtaining accurate positions and distances of three satellites.

The extended memory 570 or the internal memory 504 can comprise fast random access memory such as one or more magnetic disc storage devices and/or non-volatile memory, one or more optical storage devices, and/or a flash memory (e.g., NAND and NOR). The extended memory 570 or the internal memory 504 stores software. Software components include an operating system software module, a communication software module, a graphic software module, a user interface software module, an MPEG module, a camera software module, and one or more application software modules. A software component (program) can comprise a set of instructions (an instruction set). The operating system software includes different software components for controlling system operations. The control of the system operations includes, for example, memory management and control, storage hardware (device) control and management, and power control and management. The operating system software may process normal communication between different hardware devices and the software components (modules).

The communication software module allows the communication with other electronic devices such as a computer, server, and/or portable terminal, through the RF processor 540. The communication software module is configured to use a protocol architecture of a corresponding communication scheme. The graphic software module includes different software components for providing and displaying graphics on the touch screen 560. The term 'graphics' embraces text, webpage, icon, digital image, video, animation, for example. The user interface software module includes different software components relating to the user interface. The user interface software module is involved in the status change of the user interface and the condition of the user interface status change. The camera software module includes camera related software components allowing camera related processes and functions. The application module includes a browser including a rendering engine, an e-mail function, an instant message function, a word processing function, keyboard emulation function, an address book function, a touch list function, a widget function, Digital Right Management (DRM) function, voice recognition function, voice reproduction function, a position determining function and a location based service, for example. The memories 570 and 504 can include an additional module (instructions) in addition to the above-stated modules. Individual modules (instructions) may be omitted. The software module includes instructions for supporting a multimedia service. For example, the communication software module 503 receives SIP messages from the AP 502, determines whether the received SIP messages include a SIP message corresponding to the status check message, processes the SIP messages when the received SIP message comprises a status check message, and forwards the received SIP messages to the AP 502 to process them in the AP 502 when the received SIP message is not a status check message.

Communication processor 503 processes the status check message of the SIP messages and forwards the other SIP messages to the AP 502. Hence, the wakeup of the AP 502 for the status check message is avoided reducing current consumption. The application software module directs the voice call through the communication processor 503, and determines whether a traffic distribution or handover event occurs from the communication processor 503 to the AP 502. When such an event arises, the application software module forwards the SIP messages to the communication processor 503 and processes the voice packet data. Alternatively, the SIP message and the voice packet data may be sent to the AP 502. That is, in case of the handover from the VoLTE to the VoWiFi, the SIP message is forwarded to and processed in the communication processor 503, and the voice packet data is processed in the AP 502.

In a video call service, the AP 502 processes the SIP messages by activating communication processor 503, establishing a session for a video call service using the SIP signaling, and processing the video data and the audio data acquired from the communication processor 503.

The methods described in the claims and/or the specification of the present invention can be implemented using hardware and software. One or more programs stored to a computer-readable storage medium are configured for execution of one or more processors of the electronic device. One or more programs include executable instructions directing an electronic device to perform methods described herein. The program (software module, software) can be stored in a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the program can be stored in a memory combining part or all of different recording media. The program can be stored to an attachable storage device of the electronic device accessible via the communication network such as Internet, Intranet, Local Area Network (LAN), Wide LAN (WLAN), or Storage Area Network (SAN), or a communication network combining the networks. The storage device can access the electronic device through an external port. A separate storage device in the communication network can access the portable electronic device.

A system processes a status check message in a cellular modem to reduce power and current consumption using IPSec for the security and VoWiFi. While the system has been shown and described with reference to certain exemplary embodiments thereof, it will be understood by those skilled in the art that modifications may be made therein.

What is claimed is:

1. A method in an electronic device, comprising:
   processing a first Session Initiation Protocol (SIP) message and video data received from a first communication processor;
   in response to occurrence of a handover event from the first communication processor to a second communication processor, receiving voice data from the second communication processor; and
   forwarding a SIP message which is classified by an enhanced Packet Data Gateway (ePDG) client to the first communication processor through the ePDG client.

2. The method of claim 1, wherein the first communication processor process a second SIP message, and
   wherein the second SIP message is a keep-alive message.

3. The method of claim 1,
   wherein the first communication processor is in a voice packet service based on Voice over Long Term Evolution (LTE) (VoLTE), and wherein the second communication processor is in a voice packet service based on Voice over WiFi (VoWiFi).

4. The method of claim 3, wherein the occurrence of a handover event from the first communication processor to a second communication processor comprises:
   transitioning to the VoWiFi from the VoLTE.

5. The method of claim 1, wherein a first call session of the first communication processor employs an IP Security (IPSec) tunneling mode for providing a security tunnel between security gateways in processing packetized voice data.

6. The method of claim 1, further comprising:
   in response to receiving a status check message from the second communication processor, processing the status check message according to a predetermined procedure by the first communication processor.

7. The method of claim 1, further comprising:
in response to receiving the SIP message from the second communication processor forwarding the SIP message, by the first communication processor, to the second communication processor.

8. The method of claim 1, further comprising:
generating a second call session for a video call service by activating the first communication processor; and
processing video data or audio data received in the second call session.

9. An electronic device comprising:
a first communication processor;
a second communication processor;
an enhanced Packet Data Gateway (ePDG) client configured to classify a Session Initiation Protocol (SIP) message from the second communication processor; and
an application processor configured to process a first Session Initiation Protocol (SIP) message and video data received from the first communication processor;
in response to occurrence of a handover event from the first communication processor to the second communication processor, receives
voice data from the second communication processor; and
forwards the classified SIP message to the first communication processor.

10. The electronic device of claim 9, wherein the first communication processor process a second SIP message, and wherein the second SIP message is a keep-alive message.

11. The electronic device of claim 9, wherein the first communication processor is in a voice packet service based on Voice over Long Term Evolution (LTE) (VoLTE), and wherein the second communication processor is in a voice packet service based on Voice over WiFi (VoWiFi).

12. The electronic device of claim 11, wherein occurrence of a handover event is transitioned to the VoWiFi from the VoLTE.

13. The electronic device of claim 9, wherein the first call session of the first communication processor employs an IP Security (IPSec) tunneling mode.

14. The electronic device of claim 9, wherein, in response to receiving a status check message from the second communication processor, the first communication processor processes the status check message using a predetermined procedure.

15. The electronic device of claim 9, wherein, in response to receiving the SIP message from the second communication processor, the first communication processor forwards the SIP message to the second communication processor.

16. The electronic device of claim 9, wherein the application processor generates a second call session for a video call service by activating the first communication processor, and
the application processor processes video data or audio data received in the second call session.

17. An apparatus for supporting a multimedia service of an electronic device, comprising:
a cellular communication processor, in a voice packet service based on Voice over Long Term Evolution (LTE) (VoLTE), configured to forward a first Session Initiation Protocol (SIP) message to an application processor and to process a second SIP message, the cellular communication processor supporting Internet Protocol (IP) Security (IPSec) protocol, the application processor being configured to process the first SIP message and video data from the cellular communication processor; and
in response to a voice packet service based on the VoLTE transitioning to a voice packet service based on Voice over WiFi (VoWiFi), an enhanced Packet Data Gateway (ePDG) client classifies a SIP message and voice data from a WiFi communication processor and forwards the classified SIP message to the cellular communication processor, and forwards the voice data to the application processor.

18. The apparatus of claim 17, wherein the cellular communication processor supports at least one of Real Time Protocol (RTP) and RTP Control Protocol (RTCP).

19. The apparatus of claim 17, wherein the second SIP message is a keep-alive message.

20. The apparatus of claim 17, wherein a destination for a Transmission Control Protocol (TCP)/IP SIP message is the cellular communication processor.

* * * * *

UNITED STATES PATENT AND TRADEMARK OFFICE
CERTIFICATE OF CORRECTION

Page 1 of 1

PATENT NO. : 9,319,943 B2
APPLICATION NO. : 14/215142
DATED : April 19, 2016
INVENTOR(S) : Sang-Soo Lee et al.

It is certified that error appears in the above-identified patent and that said Letters Patent is hereby corrected as shown below:

In the Claims

Column 11, Claim 9, Lines 24-25 should read as follows:
--...processor, receive voice data...--

Column 11, Claim 9, Line 26 should read as follows:
--...forward the classified SIP...--

Column 11, Claim 13, Line 39 should read as follows:
--...wherein a first call...--

Signed and Sealed this
Seventh Day of June, 2016

Michelle K. Lee
*Director of the United States Patent and Trademark Office*